United States Patent
Behroozi et al.

(10) Patent No.: US 10,988,228 B2
(45) Date of Patent: Apr. 27, 2021

(54) FASHIONABLE HATS FOR HIGH ALTITUDE BALLOONS

(71) Applicant: LOON LLC, Mountain View, CA (US)

(72) Inventors: Cyrus Behroozi, Menlo Park, CA (US); Richard Chad Bruns, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 458 days.

(21) Appl. No.: 16/163,180

(22) Filed: Oct. 17, 2018

(65) Prior Publication Data
US 2020/0122814 A1 Apr. 23, 2020

(51) Int. Cl.
*B64B 1/40* (2006.01)
*B64B 1/58* (2006.01)
*B32B 7/02* (2019.01)
*B32B 27/08* (2006.01)
*B32B 27/36* (2006.01)
(Continued)

(52) U.S. Cl.
CPC ............... *B64B 1/58* (2013.01); *B32B 7/02* (2013.01); *B32B 27/08* (2013.01); *B32B 27/32* (2013.01); *B32B 27/36* (2013.01); *B32B 37/182* (2013.01); *B64B 1/40* (2013.01); *B32B 2250/24* (2013.01); *B32B 2307/30* (2013.01);
(Continued)

(58) Field of Classification Search
CPC .... B64B 1/16; B64B 1/40; B64B 1/44; B32B 2307/30
See application file for complete search history.

(56) References Cited

U.S. PATENT DOCUMENTS

| 3,484,058 A | 12/1969 | Struble, Jr. |
| 4,094,299 A | 6/1978 | Voelker |

(Continued)

OTHER PUBLICATIONS

Farley, "BalloonAscent: 3-D Simulation Tool for the Ascent and Float of High-Altitude Balloons", American Institute of Aeronautics and Astronautics, https://ntrs.nasa.gov/search.jsp?R=20050243623, retrieved from the Internet Sep. 3, 2018, 15 pages.
(Continued)

*Primary Examiner* — Philip J Bonzell
*Assistant Examiner* — Michael B. Kreiner
(74) *Attorney, Agent, or Firm* — Botos Churchill IP Law LLP

(57) ABSTRACT

Aspects of the technology relate to temperature regulation for high altitude, long duration balloons, such as balloons that operate in the stratosphere for weeks, months or longer. A balloon covering overlays the balloon envelope. The material properties and configuration of the balloon covering are selected to enable it to automatically cover or expose portions of the envelope depending on environmental conditions. The covering has multiple layers of materials with different coefficients of thermal expansion (CTE). The layers are chosen to have significantly different CTEs, and flaps are created in the envelope such that depending on the temperature, the flaps will either lie flat on the envelope or curl away from the envelope. In the former case, the flaps help to retain heat in the envelope, such as during nighttime operation. Conversely, in the latter case, the flaps permit heat to escape from the envelope, such as during daytime operation.

20 Claims, 9 Drawing Sheets

(51) Int. Cl.
  *B32B 37/18* (2006.01)
  *B32B 27/32* (2006.01)
(52) U.S. Cl.
  CPC ....... *B32B 2323/04* (2013.01); *B32B 2367/00* (2013.01); *B32B 2605/18* (2013.01)

(56) References Cited

U.S. PATENT DOCUMENTS

| | | | | |
|---|---|---|---|---|
| 4,986,494 | A | | 1/1991 | Tockert |
| 5,672,406 | A | * | 9/1997 | Challis .................. A61F 13/023 428/136 |
| 6,290,172 | B1 | * | 9/2001 | Yajima ...................... B64B 1/44 244/31 |
| 8,304,073 | B2 | * | 11/2012 | Davies ....................... C09J 7/29 428/354 |
| 8,590,830 | B2 | * | 11/2013 | Izutsu ....................... B64B 1/70 244/31 |
| 9,296,461 | B1 | * | 3/2016 | Roach ....................... B64B 1/58 |
| 9,527,569 | B2 | * | 12/2016 | Fournier ................ B64D 37/30 |
| 10,549,505 | B2 | * | 2/2020 | Tibbits .................... B32B 27/32 |
| 2009/0233067 | A1 | * | 9/2009 | Doornheim ............. B32B 27/08 428/203 |
| 2016/0340826 | A1 | * | 11/2016 | Tibbits ................ D06M 15/227 |
| 2018/0195213 | A1 | * | 7/2018 | Tibbits ...................... F03G 7/06 |
| 2021/0071326 | A1 | * | 3/2021 | Tibbits .................... D04B 1/16 |

OTHER PUBLICATIONS

MIR (montgolfière infrarouge):the stratospheric balloon of the CNES, http://ballonsolaire.pagesperso-orange.fr/en-historique3.htm, retrieved from the Internet Sep. 3, 2018, 2 pages.
Mylar® polyester film, DuPont Teijin Films, Product Information, Jun. 2003, 6 pages.
Morel et al., "The Occurence of Icing on Constant Level Balloons", Journal of Applied Meteorology, vol. 7, Aug. 1968, pp. 626-634.
Vin Lally and the GHOST Balloon Project, Challenges & Innovations | NCAR Archives, https://www.archives.ucar.edu/exhibits/vinlally/challenges-innovations, retrieved from the Internet Sep. 3, 2018, 2 pages.

* cited by examiner

300

FIG. 6A  600
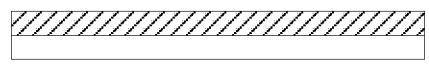
FIG. 6B
610
FIG. 6C
620
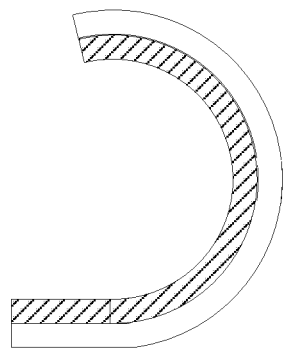
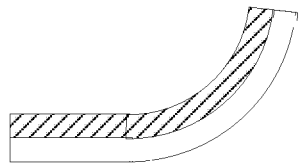

US 10,988,228 B2

FASHIONABLE HATS FOR HIGH ALTITUDE BALLOONS

BACKGROUND

Telecommunications connectivity via the Internet, cellular data networks and other systems is available in many parts of the world. However, there are many locations where data connectivity is unavailable, unreliable or subject to outages from natural disasters. Some systems may provide network access to remote locations or to locations with limited networking infrastructure via satellites or high altitude platforms located in the stratosphere. In the latter case, due to environmental conditions and other limitations, it is challenging to keep the platforms aloft and operational for long durations, such as days, weeks or more.

SUMMARY

Aspects of the technology provide balloon configurations that effectively regulate balloon temperature, thereby enhancing the balloon's longevity and durability.

According to one aspect, a balloon structure is provided. The balloon structure includes at least one gore panel forming a balloon envelope. The balloon envelope is configured to maintain pressurized lifting gas therein. The balloon structure also includes a top member disposed along an apex of the balloon envelope, a base member disposed along a bottom of the balloon envelope and configured to carry a payload, a plurality of tendons coupled to the top member and the base member, and an envelope cover. The envelope cover overlays an upper portion of the balloon envelope adjacent to the top member. The envelope cover includes a plurality of flaps therealong. The flaps are configured to lay along an outer surface of the balloon envelope at a first temperature and configured to curl away from the balloon envelope at a second temperature higher than the first temperature.

In one example, the envelope cover is a laminate sheet of at least two layers of material. A first one of the layers has a first coefficient of thermal expansion (CTE) and a second one of the layers has a second CTE different from the first CTE. The first layer may comprise polyethylene terephthalate and the second layer may comprise polyethylene. A ratio of the first CTE to the second CTE may be between 7-15×.

In another example, the plurality of flaps are configured to curl away from the balloon envelope during daytime operation of the balloon structure and are configured to lay on the outer surface of the balloon envelope during nighttime operation of the balloon structure. In this case, the balloon structure may be configured for the daytime and nighttime operation in the stratosphere.

According to one aspect, the flaps are configured to reflect heat toward the outer surface of the balloon envelope when laying on the outer surface of the balloon envelope.

In a further example, the envelope cover is affixed to the top member of the balloon structure. Here, the envelope cover may be disposed between the plurality of tendons and the outer surface of the balloon envelope.

The plurality of flaps may have a length of between 1 and 50 cm. The envelope cover may be disposed over between 10-50% of the outer surface of the balloon envelope during deployment in the stratosphere. The flaps may be rectangular in shape. Here, the width of the rectangular shape may be less than the length.

The envelope cover may be arranged to overlay the upper portion of the balloon envelope so that the plurality of flaps are not contacted by the plurality of tendons.

The at least one gore panel may comprise a set of gore panels. In this configuration, the envelope cover is arranged to overlay the upper portion of the balloon envelope so that the plurality of flaps do not overlay seams between the set of gore panels.

According to another aspect, an envelope cover is provided, which is configured to overlay a balloon envelope. The envelope cover comprises a laminate sheet of at least two layers of material. A first one of the layers has a first coefficient of thermal expansion (CTE) and a second one of the layers has a second CTE different from the first CTE. A plurality of flaps are formed in the laminate sheet. The flaps are configured to lay along an outer surface of the balloon envelope at a first temperature and configured to curl away from the balloon envelope at a second temperature higher than the first temperature.

In one example, the first layer comprises polyethylene terephthalate and the second layer comprises polyethylene. In another example, a ratio of the first CTE to the second CTE is between 7-15×. And in a further example, the flaps are rectangular in shape.

According to a further aspect, a method of manufacturing a balloon assembly is provided. The method comprises laminating two or more layers of material having different coefficients of thermal expansion (CTE) to form a unitary sheet; creating a plurality of flaps in the sheet; and affixing the sheet to the balloon assembly so that the sheet overlays an exterior surface of an envelope of the balloon assembly. The plurality of flaps are configured to lay along the exterior surface of the envelope at a first temperature and configured to curl away from the exterior surface of the envelope at a second temperature higher than the first temperature.

BRIEF DESCRIPTION OF THE DRAWINGS

FIGS. 6A-C illustrate flap curling configurations in accordance with aspects of the technology.

DETAILED DESCRIPTION

Overview

The technology relates to regulation of balloon temperature. As explained below, balloon coverings ("fashionable hats") are employed to cover or expose portions of the balloon envelope depending on environmental conditions around the balloon during flight. This is particularly beneficial for balloons intended to operate in the stratosphere.

One type of structure suitable for long-duration stratospheric operation is the superpressure balloon. A superpressure balloon is designed so that when it reaches float altitude (e.g., between about 60,000-120,000 feet above sea level), the lifting gas fills out and pressurizes the balloon's envelope. However, diurnal temperature changes can adversely affect the envelope of a superpressure balloon. For instance, there can be significant temperature swings between the full sunlight during the day and the absence of sunlight at night. These temperature swings correspondingly increase and decrease the gas pressure within the balloon's envelope. In addition, during the day clouds beneath the balloon may reflect light upwards. Heat may also be radiated up from the ground, although at night clouds may block or otherwise limit such radiation. These effects can also impact the balloon's temperature. Continued increases and decreases in pressure can stress the balloon envelope, potentially creating leaks or tears that degrade performance and reduce the length of time the balloon can remain aloft.

Temperature regulation for the envelope can beneficially reduce such pressure changes. In turn, this may reduce the possibility of envelope failure by reducing repetitive material deformation. It may also allow for the use of thinner and lighter envelope materials, which can correspondingly permit an increase in the weight of the payload that can be carried aloft by the balloon. Before going into the specifics of the configurations that promote temperature regulation, a discussion of an overall balloon system is provided.

Example Balloon Systems

Figure 1:
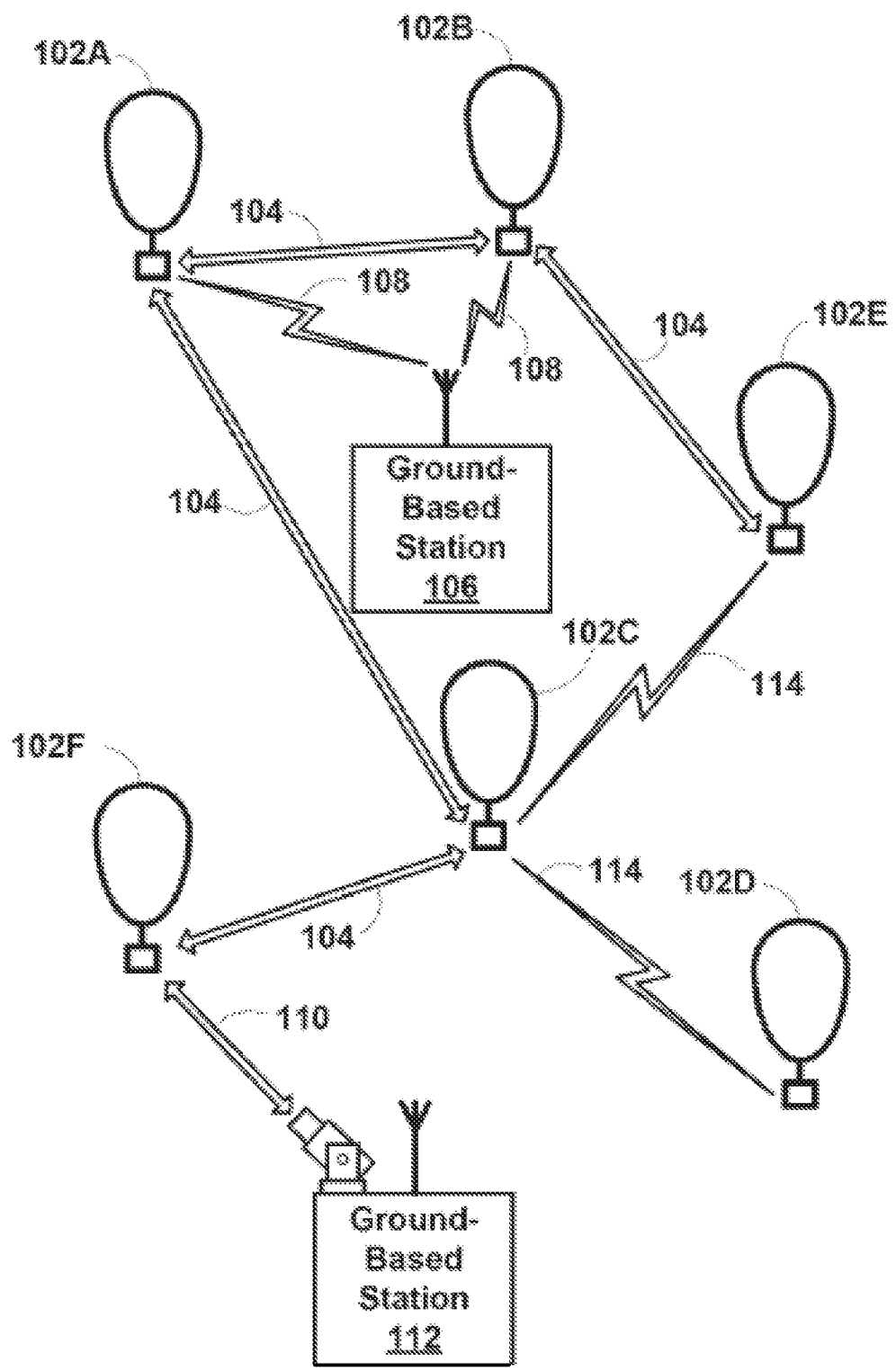
FIG. 1 is a functional diagram of an example system in accordance with aspects of the disclosure.

FIG. 1 depicts an example system 100 in which the balloons described above may be used. This example should not be considered as limiting the scope of the disclosure or usefulness of the features described herein. System 100 may be considered a "balloon network." In this example, balloon network 100 includes a plurality of devices, such as of balloons 102A-F as well as ground-base stations 106 and 112. Balloon network 100 may also include a plurality of additional devices, such as various computing devices (not shown) as discussed in more detail below.

The devices in system 100 are configured to communicate with one another. As an example, the balloons may include communication links 104 and/or 114 in order to facilitate intra-balloon communications. By way of example, links 114 may employ radio frequency (RF) signals (e.g., millimeter wave transmissions) while links 104 employ free-space optical transmission. Alternatively, all links may be RF, optical, or a hybrid that employs both RF and optical transmission. In this way balloons 102A-F may collectively function as a mesh network for packet data communications. At least some of the balloons may be configured for communications with ground-based stations 106 and 112 via respective links 108 and 110, which may be RF and/or optical links.

In one scenario, a given balloon 102 may be configured to transmit an optical signal via an optical link 104. In one example, the given balloon 102 may use one or more high-power light-emitting diodes (LEDs) to transmit an optical signal. Alternatively, some or all of the balloons 102 may include laser systems for free-space optical communications over the optical links 104. Other types of free-space optical communication are possible. Further, in order to receive an optical signal from another balloon via an optical link 104, the balloon may include one or more optical receivers.

The balloons may also utilize one or more of various RF air-interface protocols for communication with ground-based stations via respective communication links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, and/or one or more propriety protocols developed for balloon-ground RF communication, among other possibilities.

In some examples, the links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon.

Like other balloons in network 100, downlink balloon 102F may be operable for communication (e.g., RF or optical) with one or more other balloons via link(s) 104. Downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

A downlink balloon may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites and/or other types of high altitude platforms in addition to, or as an alternative to, a ground based communication link. In some embodiments, a balloon may communicate with a satellite or a high altitude platform via an optical or RF link. However, other types of communication arrangements are possible.

As noted above, the balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground. Accordingly, the balloon network 100 may apply a mesh protocol to update the state of the network as the topology of the network changes. For example, to address the mobility of the balloons 102A to 102F, the balloon network 100 may employ and/or adapt various techniques that are employed in mobile ad hoc networks (MANETs). Other examples are possible as well.

Balloon network 100 may also implement station-keeping functions to help provide a desired network topology. For example, station-keeping may involve each balloon 102A-F maintaining and/or moving into a certain position relative to one or more other balloons in the network (and possibly in a certain position relative to the ground). As part of this process, each balloon may implement station-keeping functions to determine its desired positioning within the desired topology, and if necessary, to determine how to move to the desired position.

The desired topology may vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, the balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

The balloons of FIG. 1 may be high-altitude balloons that are deployed in the stratosphere. As an example, in a high altitude balloon network, the balloons may generally be configured to operate at altitudes between 18 km and 25 km in order to avoid interference with commercial flights and to take advantage of different wind speeds and directions. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations.

Figure 2:
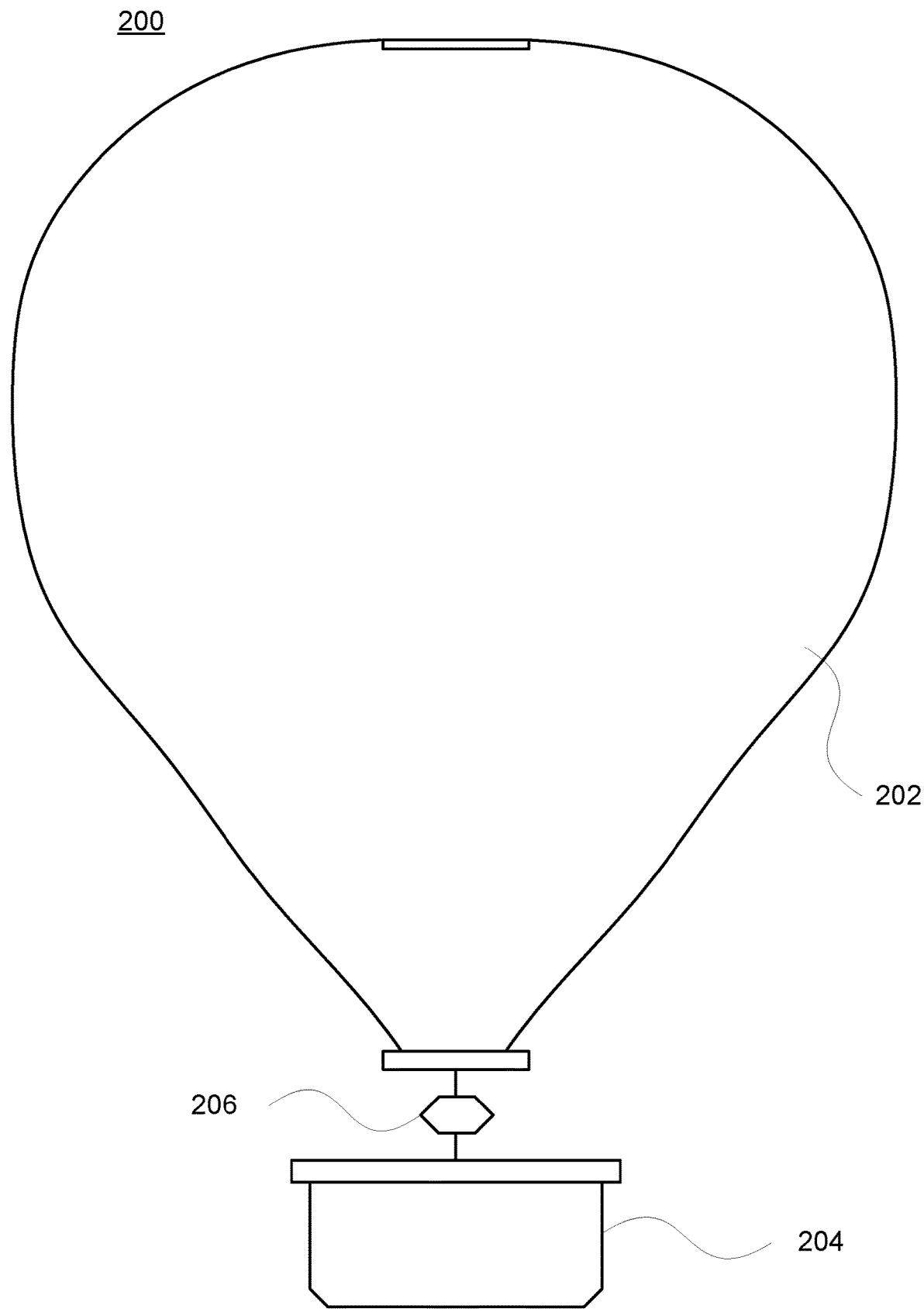
FIG. 2 illustrates a balloon configuration in accordance with aspects of the disclosure.

In example configurations the high altitude balloons include an envelope and a payload, along with various other components. FIG. 2 is one example of a high-altitude balloon 200, which may represent any of the balloons of FIG. 1. As shown, the example balloon 200 includes an envelope 202, a payload 204 and a termination (e.g., cutdown) device 206.

The envelope 202 may take various forms. For instance, the envelope 202 may be made of materials such as biaxially-oriented polyethylene terephthalate ("BoPET"). Additionally, or alternatively, some or all of the envelope 202 may be constructed from a highly-flexible latex material or rubber material such as chloroprene. Other materials or combinations thereof may also be employed. Furthermore, the shape and size of the envelope 202 may vary depending upon the particular implementation. Additionally, the envelope 202 may be filled with different types of gases, such as helium and/or hydrogen. Other types of gases, and combinations thereof, are possible as well.

Figure 3:
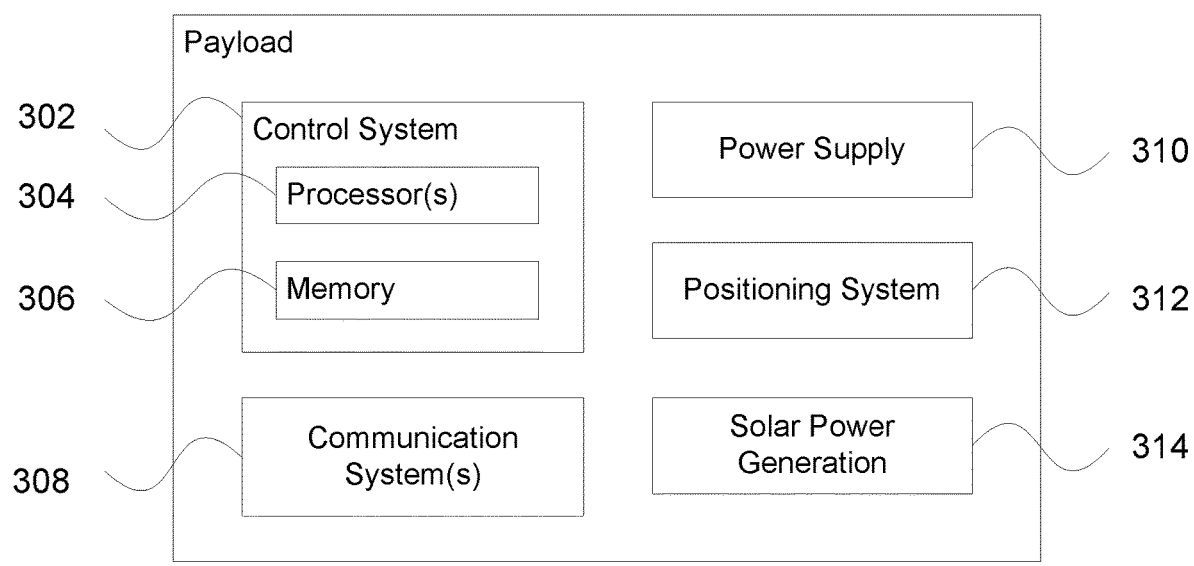
FIG. 3 is an example payload arrangement in accordance with aspects of the disclosure.

According to one example shown in FIG. 3, payload 300 includes a control system 302 having one or more processors 304 and on-board data storage in the form of memory 306. Memory 306 stores information accessible by the processor(s) 304, including instructions that can be executed by the processors. The memory 306 also includes data that can be retrieved, manipulated or stored by the processor. The memory can be of any non-transitory type capable of storing information accessible by the processor, such as a harddrive, memory card, ROM, RAM, and other memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance.

The data can be retrieved, stored or modified by the one or more processors 304 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 304 can include any conventional processors, such as a commercially available CPU. Alternatively, each processor can be a dedicated component such as an ASIC, controller or other hardware-based processor. Although FIG. 3 functionally illustrates the processor(s) 304, memory 306, and other elements of control system 302 as being within the same block, the system can actually comprise multiple processors, computers, computing devices, and/or memories that may or may not be stored within the same physical housing. For example, the memory can be a hard drive or other storage media located in a housing different from that of control system 302. Accordingly, references to a processor, computer, computing device, or memory will be understood to include references to a collection of processors, computers, computing devices, or memories that may or may not operate in parallel.

The payload 300 may also include various other types of equipment and systems to provide a number of different functions. For example, as shown the payload 300 includes one or more communication systems 308, which may transmit signals via RF and/or optical links as discussed above. The communication system(s) 308 include communication components such as one or more transmitters and receivers (or transceivers), one or more antennae, and a baseband processing subsystem. (not shown)

The payload 300 is illustrated as also including a power supply 310 to supply power to the various components of balloon. The power supply 310 could include one or more rechargeable batteries. In addition, the balloon 300 may include a solar power generation system as part of the power supply. The solar power generation system may include solar panels (not shown) and could be used to generate power that charges and/or is distributed by the power supply 310.

The payload 300 may additionally include a positioning system 312. The positioning system 312 could include, for example, a global positioning system (GPS), an inertial navigation system, and/or a star-tracking system. The positioning system 312 may additionally or alternatively include various motion sensors (e.g., accelerometers, magnetometers, gyroscopes, and/or compasses). The positioning system 312 may additionally or alternatively include one or more video and/or still cameras, and/or various sensors for capturing environmental data. Some or all of the components and systems within payload 300 may be implemented in a radiosonde or other probe, which may be operable to measure, e.g., pressure, altitude, geographical position (latitude and longitude), temperature, relative humidity, and/or wind speed and/or wind direction, among other information.

Payload 300 may include a navigation system (not shown) separate from, or partially or fully incorporated into control system 302. The navigation system may implement station-keeping functions to maintain position within and/or move to a position in accordance with a desired topology. In particular, the navigation system may use wind data to determine altitudinal adjustments that result in the wind carrying the balloon in a desired direction and/or to a desired location. Alternatively, the altitudinal adjustments may be computed by a ground based or satellite based control system and communicated to the high-altitude balloon. In other embodiments, specific balloons may be configured to compute altitudinal adjustments for other balloons and transmit the adjustment commands to those other balloons.

Figure 4:
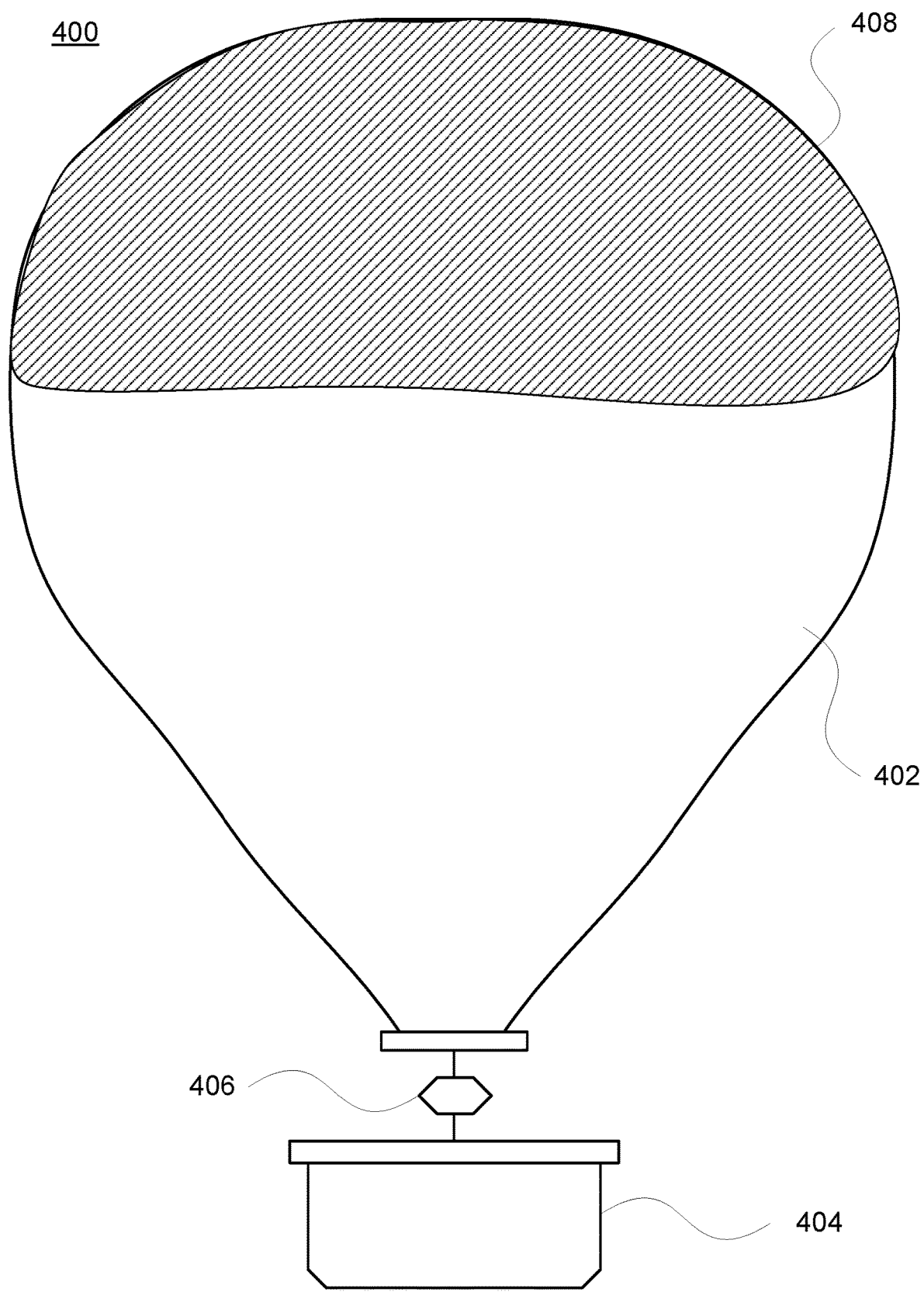
FIG. 4 is an example balloon configuration in accordance with aspects of the disclosure.

In addition or as a complement to these components, aspects of the technology provide a temperature regulation structure to help mitigate diurnal effects and other environmental conditions. For instance, a balloon covering configuration is employed that overlays a portion of the envelope. A general example is illustrated in FIG. 4 with balloon configuration 400. Here, the exemplary configuration includes envelope 402, payload 404, termination device 406 and covering structure 408. The covering structure reflects or otherwise blocks light to prevent it from reaching the envelope. In this configuration the entire covering structure 408 may overlay the envelope without accounting for variable environmental conditions. There is a tradeoff between effective temperature regulation and the weight of the covering. Furthermore, depending on the material used, a solid covering may help limit infrared radiation from the balloon at night but may also result in higher daytime temperatures. Thus, it is challenging to select one material or arrangement to handle different situations.

Example Configurations

Figure 5:
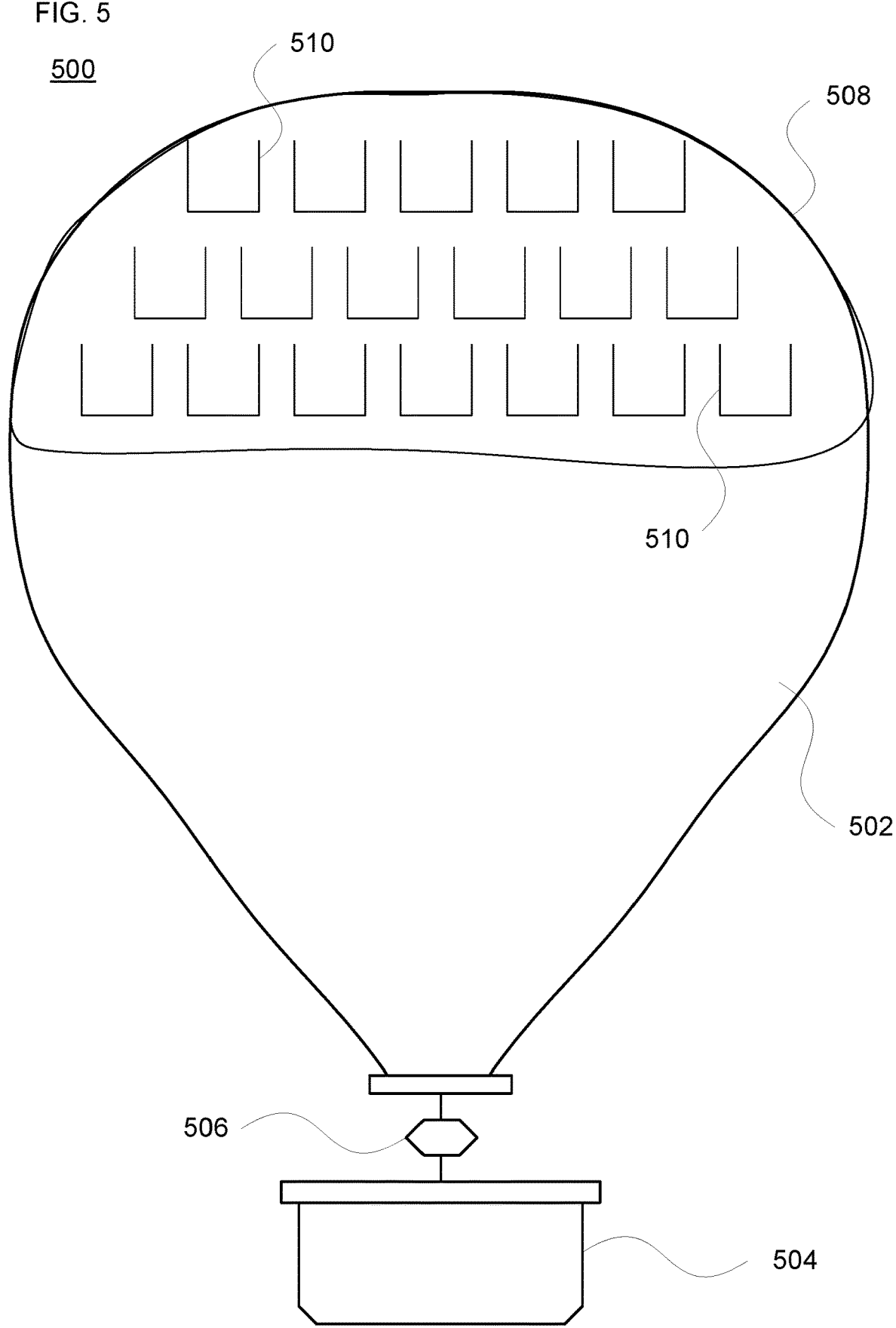
FIG. 5 illustrates a balloon configuration according to aspects of the technology.

FIG. 5 illustrates a balloon configuration 500 similar to the configuration 400 of FIG. 4, in that it includes an envelope 502, a payload 504, a termination device 506 and a covering structure 508. The covering structure 508 overlies a top region of the envelope 502, providing an opaque or otherwise light-reflective layer that blocks or reflects optical and/or infrared light. The amount of coverage of the top region may vary. For instance, in one example between about ⅓ to ½ of the entire envelope is covered. In another example, no more than the upper region that lies above the equator (e.g., midpoint) of the envelope may be covered. In still further examples, the covering structure 508 may encompass at least 10% of the envelope or no more than 75% of the envelope.

However, in contrast to the configuration of FIG. 4, the covering structure 508 includes a plurality of flaps 510 disposed therealong. The flaps are engineered so that the covering structure 508 provides a passive, self-regulating envelope cover that automatically compensates for temperature changes. In particular, the flaps roll up when warmed by sunlight or are otherwise heated, and lie flat when the temperature decreases.

In one scenario, the flaps 510 will lie flat at a "low" balloon film temperature of between about −70° C. to −60° C., and will be fully curled at a "high" balloon film temperature of between about between −50° C. to −35° C. These ranges are merely exemplary and may vary, e.g., by up to 20-25% or more. Such high and low temperature ranges may depend various factors, including the size of the envelope cover and its material properties, as well as expected temperature ranges at float altitude. The range of temperatures for incomplete or partial curling (see FIG. 6C) should be as small as possible.

The flaps comprise a laminate of at least two materials having different coefficients of thermal expansion (CTE). For example, a Polyethylene Terephthalate (PET) plastic sheet such as Mylar®, which has a low CTE, and polyethylene, which has a high CTE (e.g., 10× the CTE of Mylar®), can be laminated together to form a film that curls up and away from the envelope when warmed. Polyimides are another family of very low CTE polymers which can be laminated with a high-CTE film such as polyethylene. The ratios of CTEs may be higher or lower than 10×. For instance, the CTE ratio of two laminated layers may be between 7-15×, at least 5×, or no more than 20×.

With such laminates, during daytime operation the flaps are rolled up and at night the flaps lay flat on the balloon envelope. The flaps may be formed by, e.g., cutting a laminated sheet at specific locations. As shown in FIG. 5, the flaps may be generally rectangular, although other geometric shapes (e.g., trapezoidal, triangular, arcuate, etc.) may also be employed.

The ratio of CTEs can be chosen based on the high and low temperature ranges. If curling over a narrow temperature range is desired, a greater (higher) CTE mismatch is employed. The material thickness may be chosen with consideration to total weight, lamination/adhesive choices, robustness, and desired thermos-optical properties. The weight of the overall covering structure, including any securing mechanisms, adhesives or materials, is desirably less than the weight saved in the rest of the balloon due to lower temperature swings and therefore lower strength requirements.

FIGS. 6A-C illustrate examples of "lie flat", "fully curled" and "partially curled" flaps, respectively. As shown in example 610 of FIG. 6A, the flap in the lie flat position is generally planar. Of course, since the balloon envelope is generally curved while the balloon is floating in the stratosphere, during actual operation in the low temperature range, the lie flat position will generally conform to the shape of the envelope.

FIG. 6B illustrates an example of a fully curled position. Here, due to the CTE differences in the laminate layers, the flap curls to the largest extent possible. In one example, this exposes all or a significant portion of the underlying envelope to the external environment in order to maximize the amount of ambient light (e.g., direct sunlight) on the envelope surface. Thus, between about 75% to 100% of the underlying envelope surface may be exposed to ambient light in the fully curled configuration. Or, depending on the orientation of the balloon and location of the flap over the envelope, at least 80-85% or no less than 50% of the underlying envelope is exposed.

FIG. 6C illustrates and example of a partially curled position 620. This is an intermediary position between the lie flat and fully curled positions. Here, the amount of exposure of the underlying envelope would necessarily be less than in the fully curled configuration. As noted above, the range of temperatures for incomplete or partial curling should as limited as possible, which can be done by selection of the CTE values for each layer of the laminate.

The length of each flap and the amount of the envelope overlaid by the covering structure may also be selected to achieve the desired amount of thermal management. For example, the flap length may range between about 1-50 cm. In one scenario the length may be no longer than 25-40 cm. And in another scenario the length may be at least 10 cm. One or more series of flaps may be arranged along the covering structure. In an example configuration, the flaps are sized and arranged to provide up to 50% exposure of the underlying envelope. For instance, one arrangement of flaps may enable at least 10-25% exposure, while another arrangement of flaps may enable no more than 40% exposure.

Flap curvature may be roughly be determined according to the following calculation:

$$k = 12\Delta\varepsilon \bigg/ \left[ h\left(E + 14 + \frac{1}{E}\right) \right]$$

where k is the reciprocal of the radius of curvature,
$\Delta\varepsilon$ is the difference in thermal expansivities,
E is the stiffness ratio (Young's modulus, in pascal units), and
h is the thickness By way of example, a Mylar®-type PET may have a CTE $\alpha$ of 15 $K^{-1}$ (in units of reciprocal temperature), while a given polyethylene may have a CTE $\alpha$ of 150 $K^{-1}$. So here, $\Delta\varepsilon=135K^{-1}*\Delta T$. E(Polyethylene) is approximately 0.7 GPa, and E(Mylar-type PET) is approximately 0.5 GPa. In view of this, one configuration may have series of flaps arranged as strips with lengths on the order of 10-30 cm. The width of each strip may be less than the length, e.g., 10-50% of the length.

Figure 7:
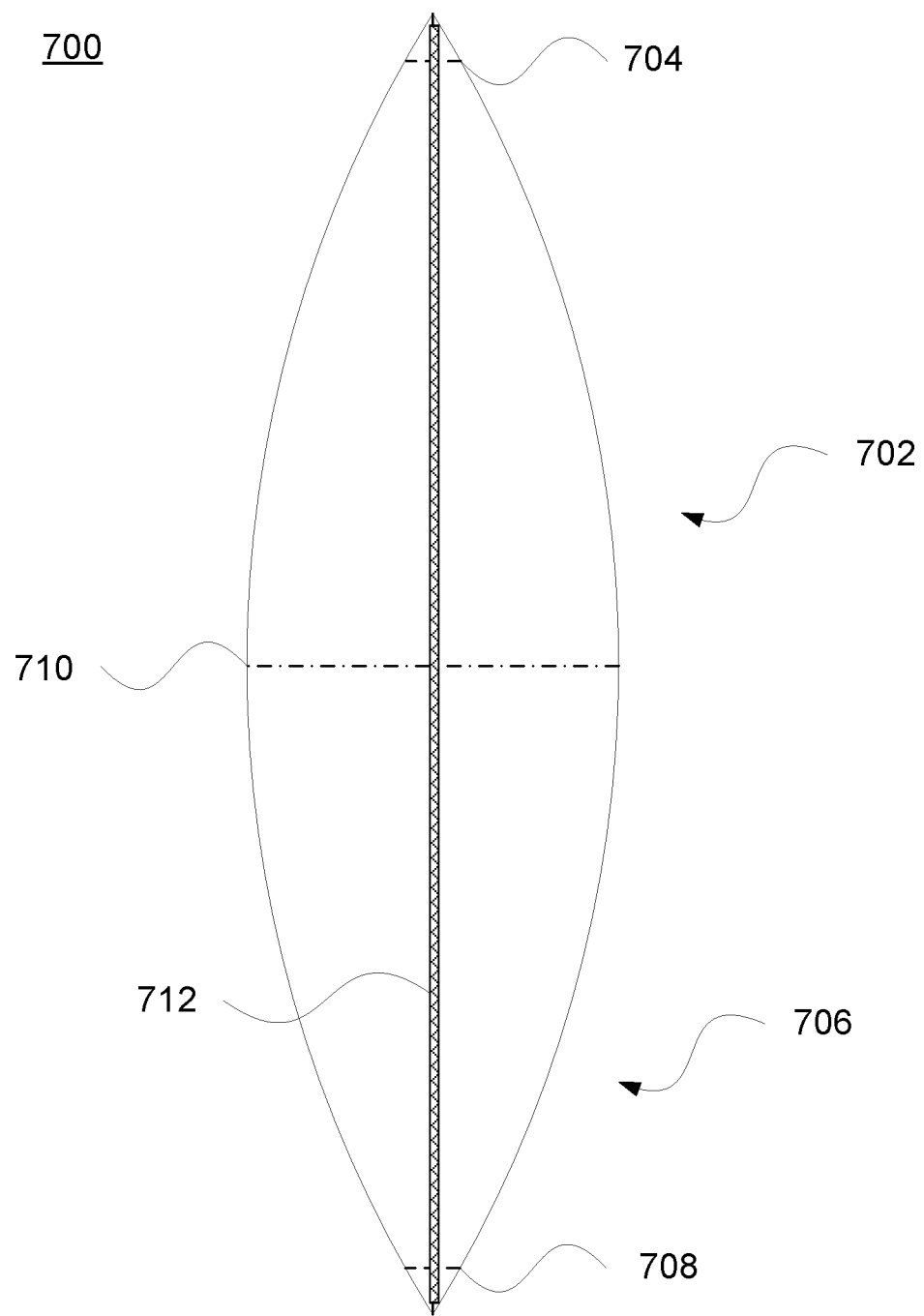
FIG. 7 illustrates a gore member in accordance with aspects of the disclosure.

In a superpressure or other balloon arrangement, the envelope may be formed from a plurality of gores sealed to one another. One example of a gore 700 is shown in FIG. 7. The gore 700 includes an upper portion 702 having an apex section 704 configured for connection to an apex load ring (not shown) positioned along a top of the balloon envelope, and a lower portion 706 having a base section 708 configured for connection to a base load ring (not shown) positioned at the bottom of the balloon envelope. For illustration purposes, an equator or centerline 710 is illustrated by the dotted-dashed line at the midpoint of the gore 700. Tendon (e.g., webbing or load tape) 712 is shown running longitudinally from the apex to the base of the gore 500. The tendon is configured to provide strength to the gore section and to help withstand the load created by the pressurized gas within the envelope when the balloon is in use. There may be a 1:1 correspondence between the number of gores and the number of tendons. Alternatively, there may be more (or less) tendons than gores.

Figure 8:
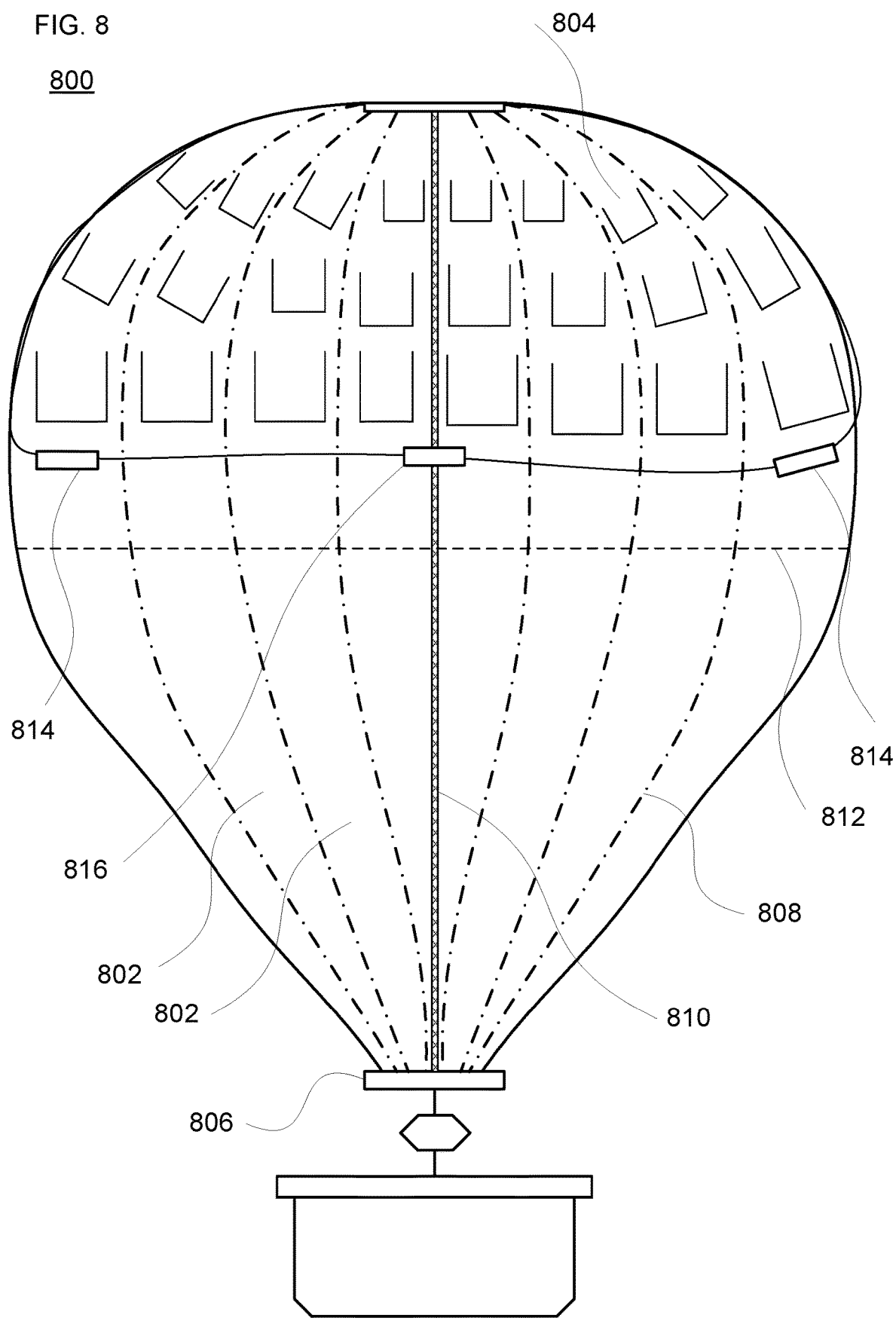
FIG. 8 illustrates an example assembled balloon configuration with flaps according to aspects of the technology.

During assembly of the balloon arrangement, the laminate cover may be draped on top of the balloon envelope. The covering structure can be affixed to the main balloon envelope at the apex and around its circumference so that it doesn't appreciably move during launch. One example arrangement 800 is illustrated in FIG. 8. Here, as noted above, gores 802 are connected to apex load ring 804 along a top of the balloon structure, and are connected to base load ring 806 along the bottom of the structure. Gore seams 808 are illustrated by dash-dot lines. One tendon 810 is shown, although a series of tendons 810 may be distributed around the envelope. Dashed line 812 illustrates an approximate equator of the envelope when fully pressurized or otherwise inflated.

As shown, the covering structure is disposed along the upper part of the envelope. In addition to being affixed along the apex, e.g., by securing to the apex load ring 804, the covering structure may also be attached at other points directly or indirectly to the envelope. For instance, connection points 814 may be bonded, taped or otherwise adhered directly to the envelope. The covering structure may underlie the tendons 810, so that the tendons restrain the covering structure and press it against the envelope. This may include connection elements 816 securing the covering structure to the tendons and/or to the envelope. While only a few connection points are shown, the covering structure may be secured to the envelope at many points or regions thereal ong, e.g., by adhesive materials or glues. FIG. 8 illustrates flaps arranged to avoid the gore seams 808 and tendon 810. Other placements, configurations and orientations are possible, including those which overlie gore seams or the seams and tendons.

Due to higher air temperatures (e.g., above 0° C.) on the ground, the flaps will likely be tightly curled at launch. Even if there is a chance that some of the flaps could be damaged (e.g., creased or torn) during launch or ascent, so long as most (e.g., 90% or more or less) of the flaps are undamaged, the covering structure will be able to provide a desired amount of thermal management. Thus, during daytime operation the flaps are curled or otherwise retracted to reduce solar heating within the envelope, and are uncurled at the lower end of the temperature range to overlie the envelope to reduce radiative heat loss from within the envelope. This provides beneficial temperature regulation for the envelope, reducing diurnal temperature variations. This can help reduce pressure variations within the envelope, thereby reducing stress on the structure and prolonging flight operations. In effect, uncurled flaps lying on the balloon envelope have the fashionable hat act like a solid cover (see, e.g., FIG. 4), whereas curled flaps will help regulate the temperature in a matter between a solid cover and no cover. For example, in one scenario a balloon with no covering may have a nighttime temperature of 230° K and daytime temperature of 250° K, for a day/night ratio of 250/230=1.09. A balloon with a solid hat may have a nighttime temperature of 240° K and daytime temperature of 261° K, also a day/night ratio of 1.09. In contrast, a balloon with a fashionable hat with flaps may have a nighttime temperature of 240° K (the same as the solid hat, since the flaps are closed) and a daytime temperature of 253° K (in between no hat and a solid hat, since the flaps are open). Thus, in this scenario the balloon with flaps would experience a day/night temperature ratio of only 1.05, which is desirable for the reasons discussed above.

Figure 9:
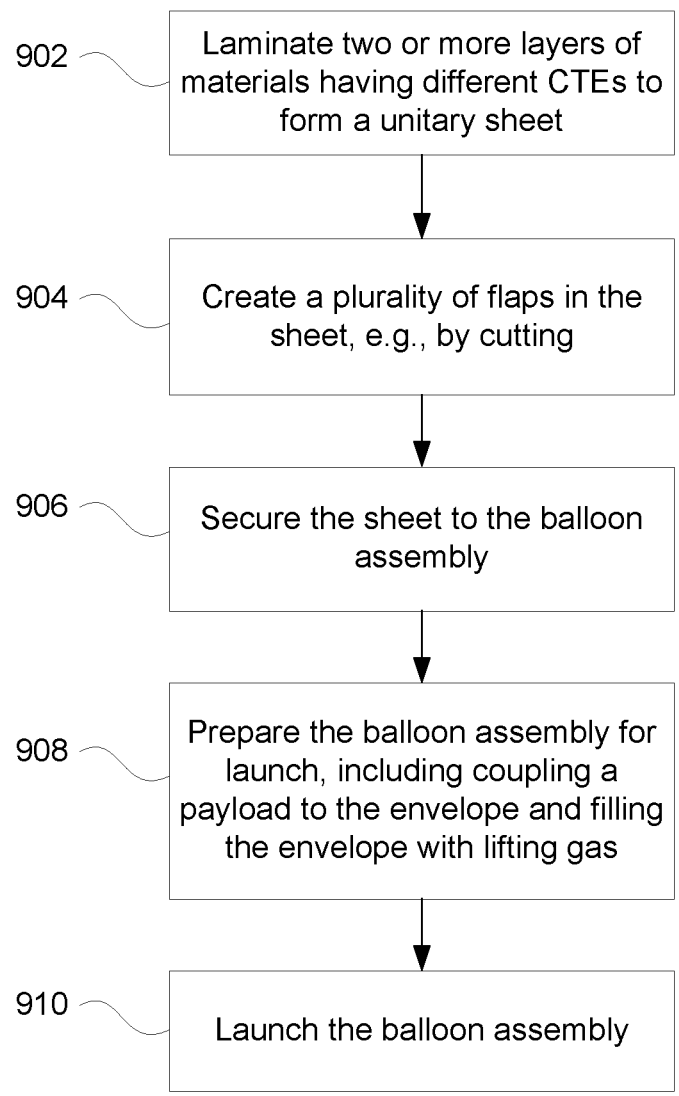
FIG. 9 is an example method of fabricating and launching a balloon structure with a heat-regulating cover in accordance with aspects of the technology.

FIG. 9 presents an example flow diagram 900 for manufacturing and launching a balloon assembly with a fashionable hat as described above. As shown at block 902, the covering structure of the fashionable hat may be formed by laminating two or more layers of material having different CTEs together. Other forms of adhesion or bonding may be employed. The result is a unitary sheet, which is preferably continuous.

Then, at block 904, a plurality of flaps are formed along the unitary sheet, for instance by cutting with a knife, laser or other tool. As discussed above, the length, width and overall shape of the flaps may vary.

At block 906, the sheet is secured to the balloon assembly. For instance, the sheet may be draped on top of the balloon envelope and affixed to an upper part of the assembly such as an apex load ring. The sheet may be secured to the envelope or other parts of the assembly by bonding, taping, tacking, adhesion, etc. In one example, portions of the sheet are arranged between the envelope exterior and the balloon tendons. Alternatively, the sheet may overlie both the envelop and the tendons. Multiple sheets may be employed and arranged to cover different places around the envelope. In this case, each sheet may be the same, or designed using different layers having different amounts of CTE, different types or arrangements of flaps, and/or having different connections to the balloon assembly. Alternatively, in another example, the sheet or sheets may be fabricated concurrently with the envelope gores. For instance, each gore may have a sheet secured to it prior to sealing the gores to one another.

At block 908, the balloon assembly is prepared for launch. This includes, for example, coupling a payload to the envelope, testing on-board electronics and other components, and filling the envelope with lifting gas. Then, once preparations are complete, the balloon assembly is launched at block 910.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A balloon structure, comprising:
   at least one gore panel forming a balloon envelope, the balloon envelope configured to maintain pressurized lifting gas therein;
   a top member disposed along an apex of the balloon envelope;
   a base member disposed along a bottom of the balloon envelope and configured to carry a payload;
   a plurality of tendons coupled to the top member and the base member; and
   an envelope cover overlaying an upper portion of the balloon envelope adjacent to the top member, the envelope cover including a plurality of flaps therealong, the flaps being configured to lay along an outer surface of the balloon envelope at a first temperature and configured to curl away from the balloon envelope at a second temperature higher than the first temperature.

2. The balloon structure of claim 1, wherein the envelope cover is a laminate sheet of at least two layers of material, a first one of the layers having a first coefficient of thermal expansion (CTE) and a second one of the layers having a second CTE different from the first CTE.

3. The balloon structure of claim 2, wherein the first layer comprises polyethylene terephthalate and the second layer comprises polyethylene.

4. The balloon structure of claim 2, wherein a ratio of the first CTE to the second CTE is between 7-15×.

5. The balloon structure of claim 1, wherein the plurality of flaps are configured to curl away from the balloon envelope during daytime operation of the balloon structure and are configured to lay on the outer surface of the balloon envelope during nighttime operation of the balloon structure.

6. The balloon structure of claim 5, wherein the balloon structure is configured for the daytime and nighttime operation in the stratosphere.

7. The balloon structure of claim 1, wherein the flaps are configured to reflect heat toward the outer surface of the balloon envelope when laying on the outer surface of the balloon envelope.

8. The balloon structure of claim 1, wherein the envelope cover is affixed to the top member of the balloon structure.

9. The balloon structure of claim 8, wherein the envelope cover is disposed between the plurality of tendons and the outer surface of the balloon envelope.

10. The balloon structure of claim 1, wherein the plurality of flaps have a length of between 1 and 50 cm.

11. The balloon structure of claim 1, wherein the envelope cover is disposed over between 10-50% of the outer surface of the balloon envelope during deployment in the stratosphere.

12. The balloon structure of claim 1, wherein the flaps are rectangular in shape.

13. The balloon structure of claim 12, wherein the width of the rectangular shape is less than the length.

14. The balloon structure of claim 1, wherein the envelope cover is arranged to overlay the upper portion of the balloon envelope so that the plurality of flaps are not contacted by the plurality of tendons.

15. The balloon structure of claim 1, wherein the at least one gore panel comprises a set of gore panels, and the envelope cover is arranged to overlay the upper portion of the balloon envelope so that the plurality of flaps do not overlay seams between the set of gore panels.

16. An envelope cover configured to overlay a balloon envelope, the envelope cover comprising:
   a laminate sheet of at least two layers of material, a first one of the layers having a first coefficient of thermal expansion (CTE) and a second one of the layers having a second CTE different from the first CTE; and
   a plurality of flaps formed in the laminate sheet, the flaps being configured to lay along an outer surface of the balloon envelope at a first temperature and configured to curl away from the balloon envelope at a second temperature higher than the first temperature.

17. The envelope cover of claim 16, wherein the first layer comprises polyethylene terephthalate and the second layer comprises polyethylene.

18. The envelope cover of claim 16, wherein a ratio of the first CTE to the second CTE is between 7-15×.

19. The envelope cover of claim 16, wherein the flaps are rectangular in shape.

20. A method of manufacturing a balloon assembly, the method comprising:
   laminating two or more layers of material having different coefficients of thermal expansion (CTE) to form a unitary sheet;
   creating a plurality of flaps in the sheet; and affixing the sheet to the balloon assembly so that the sheet overlays an exterior surface of an envelope of the balloon assembly;

wherein the plurality of flaps are configured to lay along the exterior surface of the envelope at a first temperature and configured to curl away from the exterior surface of the envelope at a second temperature higher than the first temperature.

* * * * *